US011526898B2

(12) United States Patent
 Kholodkov

(10) Patent No.: US 11,526,898 B2
(45) Date of Patent: Dec. 13, 2022

(54) DYNAMIC VISUALIZATION OF PRODUCT USAGE TREE BASED ON RAW TELEMETRY DATA

(71) Applicant: Microsoft Technology Licensing, LLC, Redmond, WA (US)

(72) Inventor: Dmitry Valentinovich Kholodkov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 355 days.

(21) Appl. No.: 16/561,916

(22) Filed: Sep. 5, 2019

(65) Prior Publication Data

US 2021/0073829 A1     Mar. 11, 2021

(51) Int. Cl.
*G06Q 30/02*      (2012.01)
*G06F 9/451*      (2018.01)
*G06F 16/28*      (2019.01)
*G06F 11/30*      (2006.01)
*G06F 11/34*      (2006.01)

(52) U.S. Cl.
CPC ......... *G06Q 30/0201* (2013.01); *G06F 9/451* (2018.02); *G06F 11/302* (2013.01); *G06F 11/3447* (2013.01); *G06F 16/288* (2019.01)

(58) Field of Classification Search
CPC ................................................ G06Q 30/0201
See application file for complete search history.

(56) References Cited

U.S. PATENT DOCUMENTS

| 6,509,898 | B2 | 1/2003 | Chi et al. |
| 7,278,105 | B1 | 10/2007 | Kitts et al. |
| 8,381,196 | B2 | 2/2013 | Warren et al. |
| 9,590,880 | B2 | 3/2017 | Ashby et al. |
| 2005/0223361 | A1 | 10/2005 | Belbute |
| 2015/0046512 | A1* | 2/2015 | Ashby et al. ........... H04L 43/08 |

(Continued)

OTHER PUBLICATIONS

Chen, et al., "Quotient Space Granular Computing for the Clickstream Data Warehouse in Web Servers", In Proceedings of the International Conference on Computer and Communication Technologies in Agriculture Engineering, Jun. 12, 2010, pp. 93-96.

(Continued)

*Primary Examiner* — James J Debrow
(74) *Attorney, Agent, or Firm* — Newport IP, LLC; Leonard J. Hope

(57) ABSTRACT

Aspects of the present disclosure relate to the visualization of product usage utilizing telemetry data associated with the product. More specifically, a first object identifier associated with an object, such as a method, function, or other portion of code, may be provided as part of the telemetry data together with an execution time stamp. A second object identifier may also be received, where the second object identifier is associated with object execution subsequent to the first object. Based on the first and second object identifier, an object pair may be determined and graphed at a path execution tree. In some instances, the object pairs may be filtered in accordance with a number of occurrences within a certain period of time, where a high number of occurrences is indicative of an intended path of one or more users.

20 Claims, 13 Drawing Sheets

(56) References Cited

U.S. PATENT DOCUMENTS

| | | | |
|---|---|---|---|
| 2015/0148138 A1 | 5/2015 | Rabin et al. | |
| 2015/0347278 A1 | 12/2015 | Sinha et al. | |
| 2016/0224461 A1* | 8/2016 | Araya | G06F 11/36 |
| 2017/0053208 A1* | 2/2017 | Krishnamurthy et al. | G06N 5/04 |
| 2018/0365336 A1 | 12/2018 | Raghavendra et al. | |
| 2020/0084114 A1* | 3/2020 | Keppler et al. | H04L 12/24 |
| 2020/0242009 A1* | 7/2020 | Webb | G06F 11/36 |

OTHER PUBLICATIONS

"International Search Report and Written Opinion Issued in PCT Application No. PCT/US20/038012", dated Oct. 8, 2020, 10 Pages.

"DX Application Performance Management", Retrieved from: https://web.archive.org/web/20190710131833/https:/www.ca.com/us/products/ca-application-performance-management.html?intcmp=headernav, Jul. 10, 2019, 8 Pages.

"Pivotal Telemetry", Retrieved from: https://pivotal.io/legal/telemetry, Jul. 23, 2019, 3 Pages.

"Product Usage & Log Analytics", Retrieved from: https://web.archive.org/web/20170812152856/https:/www.elderresearch.com/analytics-solutions/product-usage-analytics-consulting, Aug. 12, 2017, 5 Pages.

"Revulytics Boosts Software Usage Analytics with Interactive Path Analytics", Retrieved from: https://www.globenewswire.com/news-release/2019/04/23/1807987/0/en/Revulytics-Boosts-Software-Usage-Analytics-with-Interactive-Path-Analytics.html, Apr. 23, 2019, 3 Pages.

Logic, Sumo, "Telemetry and Feedback", Retrieved from: https://www.sumologic.com/insight/devops-telemetry-feedback/, May 22, 2019, 5 Pages.

Turn, et al., "Modernize Your Apps with Monitoring and Telemetry", Retrieved from: https://docs.microsoft.com/en-us/dotnet/standard/modernize-with-azure-and-containers/modernize-existing-apps-to-cloud-optimized/modernize-your-apps-with-monitoring-and-telemetry, Apr. 30, 2018, 4 Pages.

* cited by examiner

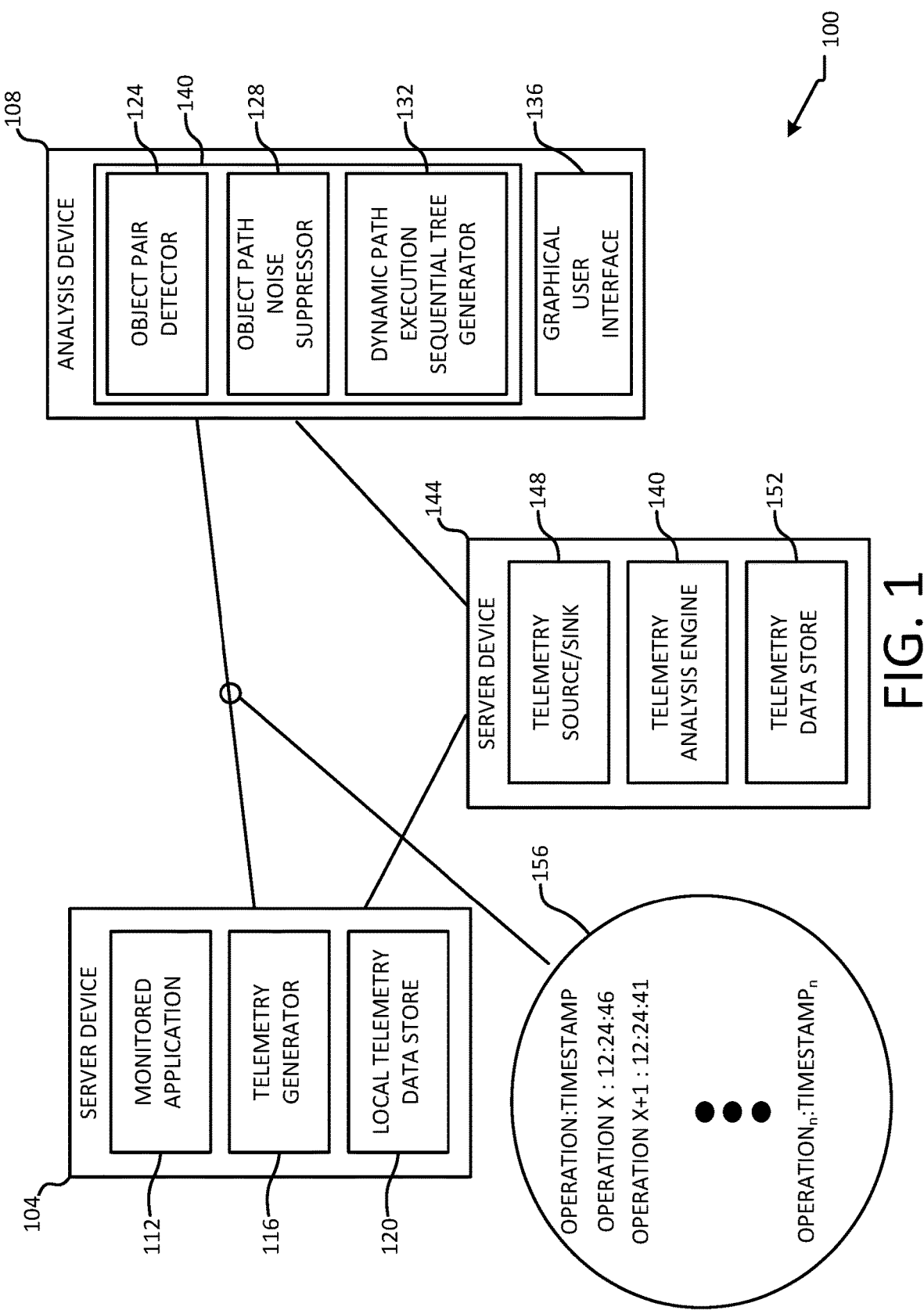

DYNAMIC VISUALIZATION OF PRODUCT USAGE TREE BASED ON RAW TELEMETRY DATA

BACKGROUND

Real-time application usage monitoring tends to focus on technical aspects of an application, such as reads, writes, throughput, etc., rather than providing a manner for a designer or engineer to determine whether or not users are using an application as intended. Accordingly, without being able to determine how users are actually using an application, application execution paths tend not to be optimized and features that users no longer interact with tend to remain in software applications well past their useful lifetime.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to the generation of path execution trees based on telemetry data received from an application monitor. More specifically, because an application monitor can provide the necessary telemetry data without having to modify an existing application, real-time application usage can be obtain quickly and efficiently with little to no upkeep or maintenance resulting from the monitoring. In examples, telemetry data is received that includes object executions together with execution timestamps and an identifier uniquely identifying the executing object. As used herein, an object may refer to a method, function, code block, operation, portion of code, or other compartmentalized instructions for performing an operation at a computing device. Pairs of related objects may be identified based on the execution timestamp information, where a second object executed temporally and sequentially after a first object may be related to the first object. Each of the objects may then be represented on a graph such that a code path existing between two temporally adjacent objects provides object execution information. The code path generally indicates a progression of how objects are being used by users, how objects are being accessed by users, and/or how popular a particular object is. In other examples, the code path may be used to evaluate how effective a popular feature is and/or whether or not a new feature is being used.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1 illustrates wan overview of an example system for generating path execution trees in accordance with examples of the present disclosure.

DETAILED DESCRIPTION

Figure 2A:
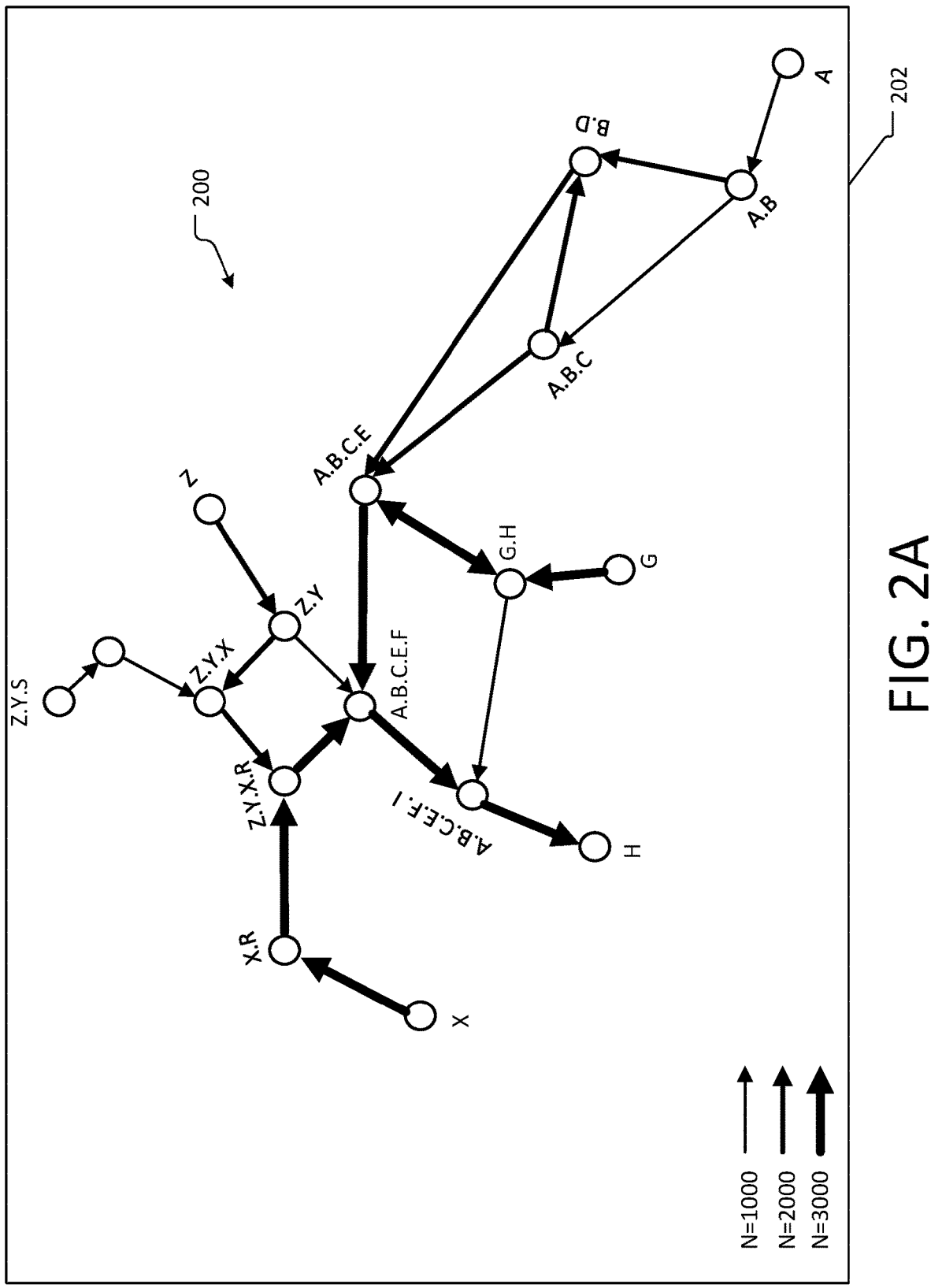
FIG. 2A illustrates a first example of a path execution tree in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A sequential code execution tree allows the execution of complex applications to be visualized based on real-time usage data. More specifically, by obtaining usage data directed to the execution of one or more code objects, such as a method, function, or other code structure, a picture of how a software application is being used over time may be generated. Moreover, when multiple users are using an application, the differences between how one user uses the application and how another user uses the application generally drives future improvements. In addition, while designers and engineers generally develop applications for use in a certain manner, there is no easy method to determine whether users are using an application as intended and/or to obtain information about how users are using the application. In accordance with examples of the present disclosure, examples described herein provide a manner to enable the visualization of the complete quantitative magnitude of application usage scenarios at scale and without modifying existing application code. That is, examples presented herein enable an engineering team to visualize and understand the complex product usage scenarios and provide a manner to identify critical code execution paths for optimization.

FIG. 1 illustrates an overview of a system 100 for generating path execution trees in accordance with examples of the present disclosure. As discussed above, a path execution tree is a tree structure indicating an execution path in terms of one or more objects of an application. For example, a user may interact with an application utilizing various buttons, screens, images, actions, and the like; as the user navigates or otherwise interacts with an application, the user's actions may be stored in terms of the executed objects of the application. While the user's specific interactions with the objects may not be stored, the specific objects that the user encountered and caused to execute, such as a method or function, may be tracked or monitored. For example, if a user interacts with a first object that causes a second object to be presented to the user, the indication that the first object resulted in the second object may be stored or otherwise associated with an occurrence of the second object happening. As more and more features are added to applications, at least one mechanism for determining how an actual application is used vs how the designers and engineers thought the application would be used is to monitor the executions of the individual objects within the application.

As illustrated, system 100 includes a server device 104, analysis device 108, and server device 144. In examples, the server device 104, analysis device 108, and server device 144 communicate using a network, such as a local area network, a wireless network, or the Internet, or any combination thereof. In an example, the analysis device 108 is any of a variety of computing devices, including, but not limited to, a mobile computing device, a laptop computing device, a tablet computing device, or a desktop computing device. In other examples, the server device 104, analysis device 108, and/or server device 144 are computing devices, including, but not limited to, virtualized computing devices, desktop computing devices, or distributed computing devices. It will be appreciated that while the system 100 is illustrated as including one server device 104, one analysis device 108, and one server device 144, any number of devices may be used in other examples.

The analysis device 108 is illustrated as including a telemetry analysis engine 140 including an object pair detector 124, an object path noise suppressor 128, and a dynamic path execution tree generator 132. In examples, the telemetry analysis engine 140 receives telemetry data from the server device 104 and generates dynamic path execution trees for display at a graphical user interface, such as, but not limited to the graphical user interface 136. As used herein, telemetry data may include but is not limited to execution data related to or otherwise generated from the monitoring of an application running at a computing device; the telemetry data may include or otherwise identify objects that are executing, where an object includes but is not limited to a portion of code, operation, method, or other compartmentalized instructions for performing an operation at a computing device. The telemetry data may also include a timestamp for a last execution of the object; telemetry data 156 is a non-limiting example of telemetry data generated from the server device 104 or otherwise obtained by the analysis device 108.

A dynamic path execution tree is a graphic illustrating a sequenced execution of objects. For example, a first object may correspond to a method in a portion of programmed code being executed, or to be executed, as part of an application running on a computing device, where the first object may be invoked or otherwise executed in response to a user operation, such as, but not limited to, a click of an application button within an application executing at a computing device, such as server device 104. A second object corresponding to a method in a portion of programmed code being executed, or to be executed, as part of an application running on a computing device may be called by the first object, and/or may be invoked or otherwise executed after the first object and in response to another user operation, such as, but not limited to a click of an application button. Therefore, a sequence of object executions involving the first object and the second object may be considered as an object pair. According to aspects described herein, the object pair detector 124 of the telemetry analysis engine 140 may be utilized to identify such object pairs.

The system 100 may operate without user information and/or user session information while multiple user sessions are potentially active executing various objects. Accordingly, because information specifically associating one object to another object is lacking, it is becomes difficult to determine if an object is executed as part of an object pair, or if an object is just executed in close sequential proximity to the first object (e.g., the timestamps are close to one another). Accordingly, the object pairs obtained by the object pairs detector 124 may be subjected to object path noise suppression utilizing the object path noise suppressor 128 to determine which object pairs have objects associated with one another. That is, the object pair detector 124 may detect object pairs based on timestamps, where some objects may lack a temporal and sequential association with a previous and/or subsequent object, thereby creating noise in the system 100. Accordingly, the object path noise suppressor 128 may determine which sequences are true sequenced executions and which sequences are not true sequenced executions by tracking the number of object pair execution occurrences over time. Happenstance object sequence executions would be expected to occur less frequently than deliberate and purposeful object sequence execution. Accordingly, if a number of object pair execution occurrences of an object pair (that is, object A executes followed by object B executing) is greater than a threshold, it may be assumed that the object pair is a true sequence and the two objects form an object path, where an object path is a link between the first object and the second object. The object path between the object pair may be part of a larger object path sequential tree which may be generated by the dynamic path execution tree generator 132; accordingly, an object path sequential tree that includes one or more object paths may be dynamically generated and output to the graphical user interface 136.

As depicted in FIG. 1, the system 100 includes the server device 104 and the server device 144. The server device 104 may include a monitored application 112, a telemetry generator 116, and/or a local telemetry data store 120. The monitored application 112 may be specific to a single organization or span multiple organizations. Moreover the monitored application 112 may be monitored utilizing one or more telemetry monitor applications. The monitoring techniques utilizing telemetry data may be employed to monitor the execution of portions of code, such as a method or function; such techniques require no customizations to the application, such as modifying methods to include numbers or otherwise. The monitoring techniques may monitor execution and method calls without requiring the application, such as methods or code objects, to be modified. The application may correspond to any application running at the server device 104, for example, a web application, a client application, or the like. In some instances, the telemetry generator may assemble all acquired telemetry and provide such information to the analysis device 108. Alternatively or in addition, the telemetry generator may assemble all acquired telemetry and provide such information to the local telemetry data store 120 for later user. Alternatively, or in addition, the telemetry generator may assemble all acquired telemetry and provide such information to the server device 144.

The server device 144 may be a server device specific to storing and then analyzing telemetry information. Similar to the analysis device 108, the server device 144 may include a telemetry analysis engine configured to generate an object path sequential tree for display at a graphical user interface of a display device. The server device 144 may then store the object path sequential tree in the telemetry data store 152.

FIG. 2A illustrates an example path execution tree 200 in accordance with examples of the present disclosure. The path execution tree 200 may be presented in a graphical user interface 202. The path execution tree 200 may include object pairs having paths there between. Each object, or code portion, may correspond to a user action or an execution of the object at the monitored application. The path execution tree 200 generally illustrates how users use or otherwise interact with the monitored application 112. For example, a first object A may correspond to an element load method invoked when a user loads a first page of the monitored application 112 for example. A user may click on a button sending the user to a second page or user interface, where the code object associated with the button click may be code object A.B. of the monitored application 112. Accordingly, a path between object A and object A.B may be formed. The path execution tree 200 may illustrate that the object A.B. is mildly interesting since users tend to move to B.D. or A.B.C. Similarly, a user may invoke a process, object, or operation B.D; as illustrated in FIG. 2A, process, object, or operation B.D may be accessed two ways, were a first way is from the object A.B.C. and the second way is from the object A.B.

The path execution tree 200 may also provide an indication distinguishing high traffic paths from low traffic paths. For example, a path from A.B.C.E to A.B.C.E.F may be considered to be a high traffic path as indicated by a thicker line; in accordance with examples of the present disclosure, the thicker line may correspond to a number of occurrences of the path in a period of time, for example more than 3000 occurrences in a four hour period. That is, the object pair A.B.C.E and A.B.C.E.F may have occurred more than 3000 times; accordingly, the path between A.B.C.E and A.B.C.E.F. may be represented with a thicker line.

Similarly, the thinner line from G.H. to A.B.C.E.F.I may correspond to a less used sequence of operations. That is, users using the monitored application 112 for example, may execute the order of operations G.H. and A.B.C.E.F.I. less than a 1000 times in a four hour period as indicated in FIG. 2A. In some examples, the reason for the low usage may be unintended; that is, users may wish to execute A.B.C.E.F.I., but are unable to easily do so from G.H. In some instances, the low usage may be an indication as to how users are actually using the monitored application 112 vs. how designers intended the users to use the monitored application 112. For example, G.H. may correspond to a menu screen and A.B.C.E.F.I. may correspond to a menu element; however, the menu element A.B.C.E.F.I. may be placed in a location where users are unable to readily view such menu element. Accordingly, the object pair G.H. and A.B.C.E.F.I. may occur 1000 times whereas the object pair A.B.C.E.F. and A.B.C.E.F.I. may occur over 3000 times. In some instances, the menu element A.B.C.E.F.I. may be more readily visible on a menu screen A.B.C.E.F. than a menu screen G.H. The path execution tree 200 may be displayed for an entire monitored application 112 or a portion of monitored application 112. For example, the path execution tree 200 may display object pairs and paths for a specific feature, component, or grouping of the monitored application 112. Of course, the examples of code objects being menu elements and/or buttons are for example purposes only. The path execution tree may include all objects in an application, for example all method calls.

Figure 2B:
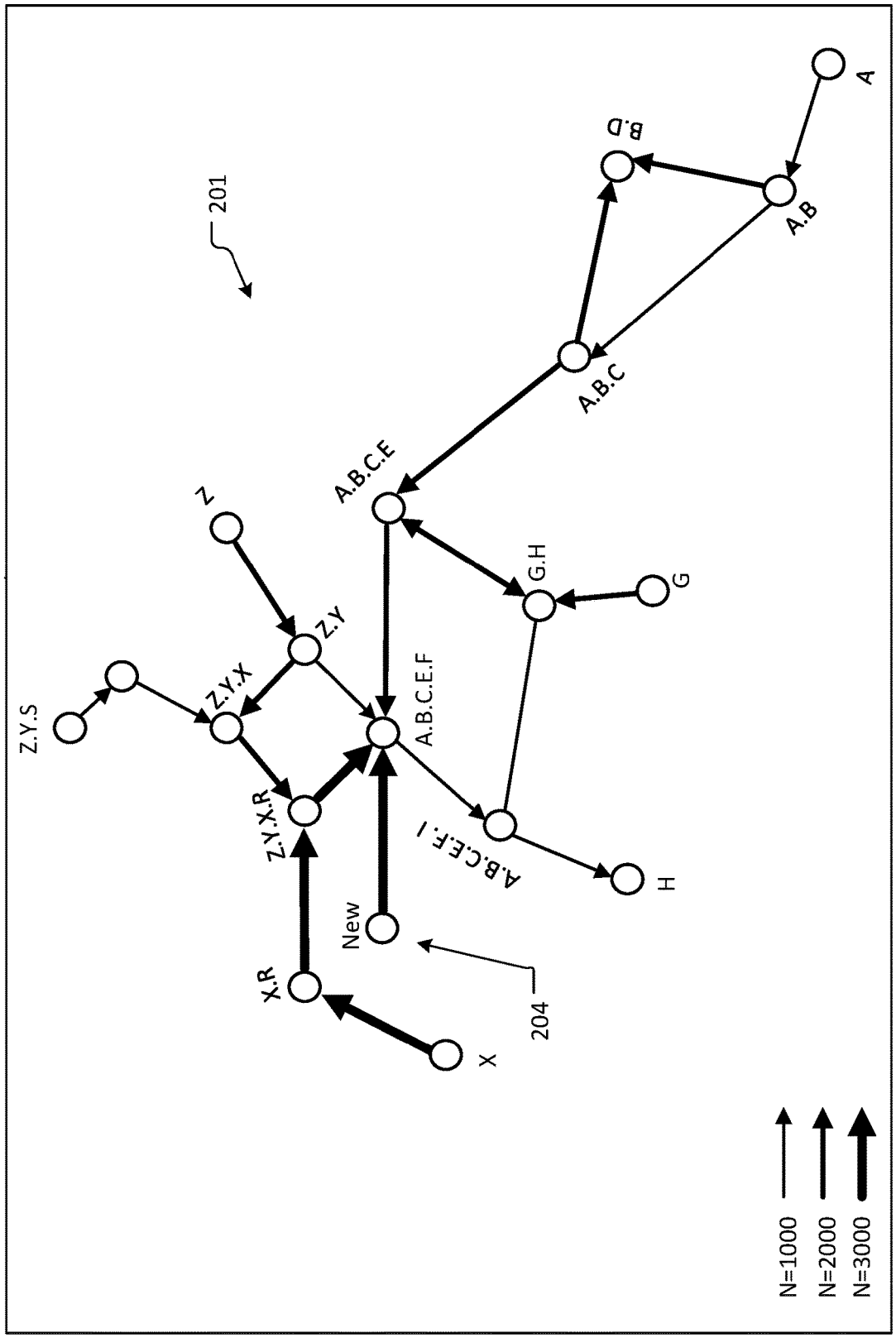
FIG. 2B illustrates a second example of a path execution tree in accordance with examples of the present disclosure.
Figure 2C:
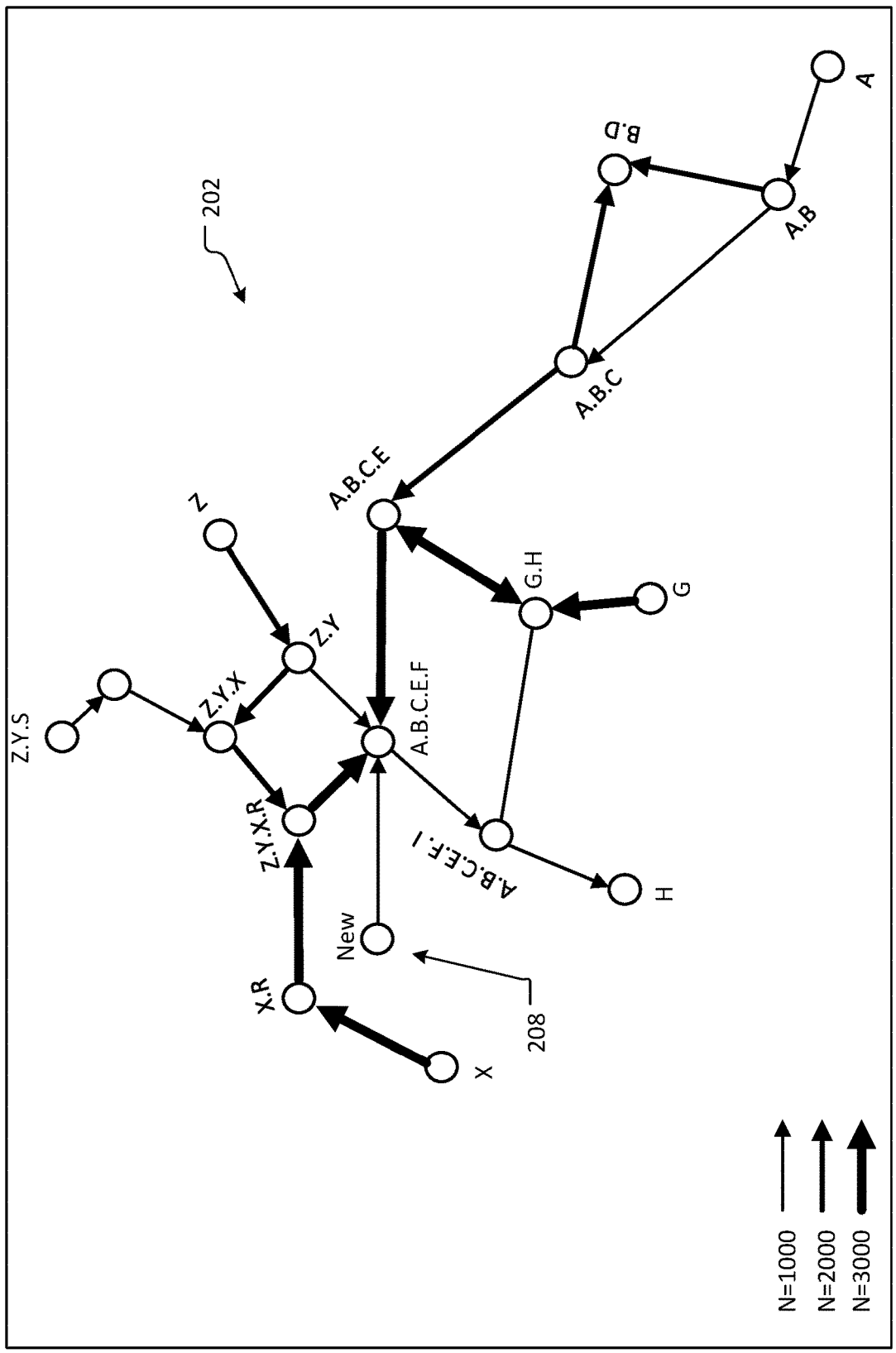
FIG. 2C illustrates a second example of a path execution tree in accordance with examples of the present disclosure.

In accordance with examples of the present disclosure, the path execution tree 200 may be utilized to measure how popular a new feature is and/or how the introduction of a new feature impacts or alters usage of the monitored application 112. For example, and as depicted in the object path sequential tree 201 of FIG. 2B, a new feature 204 may be added to the path execution tree 200 of FIG. 2A. As indicated by the thicker line between the new feature and the object A.B.C.E.F, a lot of users may utilize the new feature as an entry point into the A.B.C.E.F. component or object. Accordingly, designers may utilize the object path sequential tree to optimize traffic flow issues and/or determine issues or problems with existing applications such as application layouts. Similarly, and as depicted in FIG. 2C, a path between a new feature or component 208 and the existing component or object A.B.C.E.F., may result in little to no improvement. That is, as the path between A and A.B.C.E.F. is depicted as being a thinner line indicating low usage, a designer may be able to determine that users are using the new component less than expected. Accordingly, when comparing new traffic flow patterns to a traffic flow baseline pattern, such as the path execution tree 200 of FIG. 2A, a determination regarding new feature acceptance can be made.

Figure 3A:
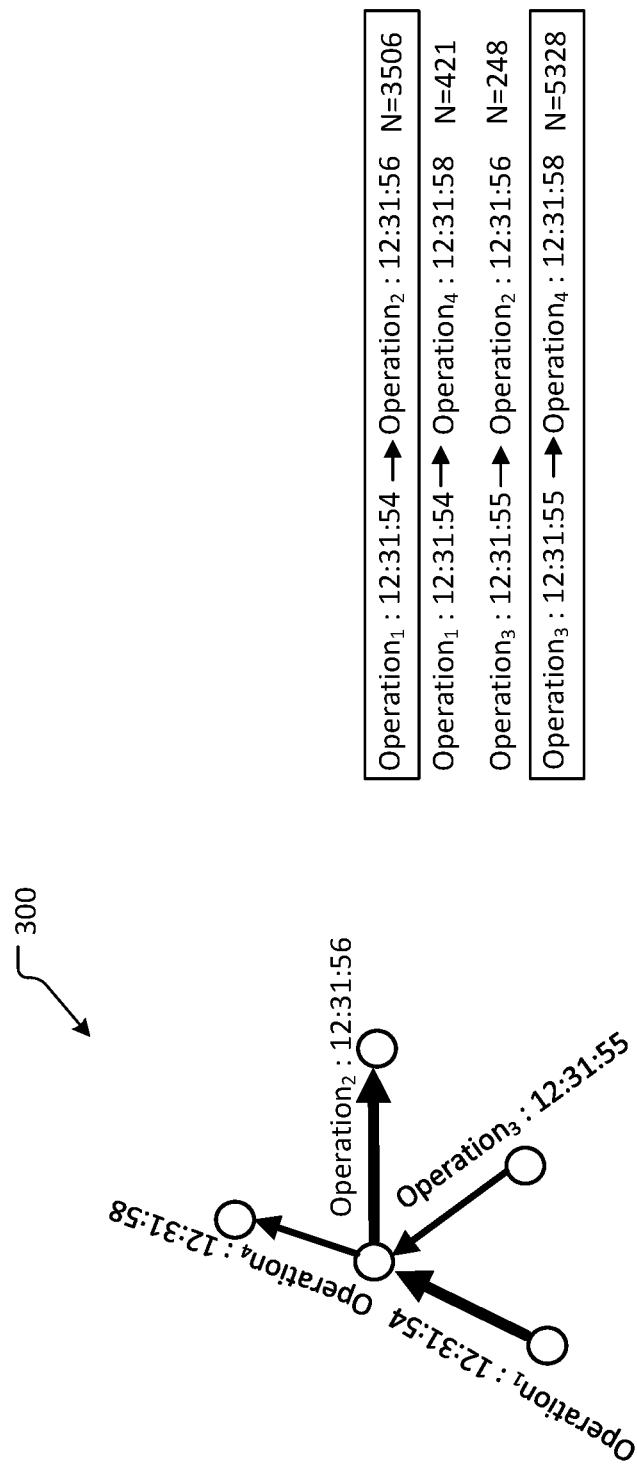
FIG. 3A illustrates a first example directed to a path execution tree noise suppression technique in accordance with examples of the present disclosure.

FIG. 3A depicts an example path execution tree 300 in accordance with examples of the present disclosure. More specifically, FIG. 3A depicts additional details related to an object path noise suppression process for determining which object pairs, and therefore object pair paths, are true object pairs and/or paths. For example, a true object pair includes a subsequent operation or object that is related to or otherwise associated with a previous operation or object. More specifically, a first object, such as Operation$_1$ may be executed at 12:31:54 as indicated in telemetry data. Second subsequent objects, Operation$_2$ and Operation$_4$ may be linked to or otherwise associated with the Operation$_1$ because Operation$_2$ and Operation$_4$ occur after Operation$_1$. However, based on a measured number of occurrences where Operation$_2$ follows Operation$_1$ (e.g., N=3506), it can be inferred that Operation$_2$ is linked to Operation$_1$. Similarly, Operation$_3$ is linked to Operation$_4$.

Figure 3B:
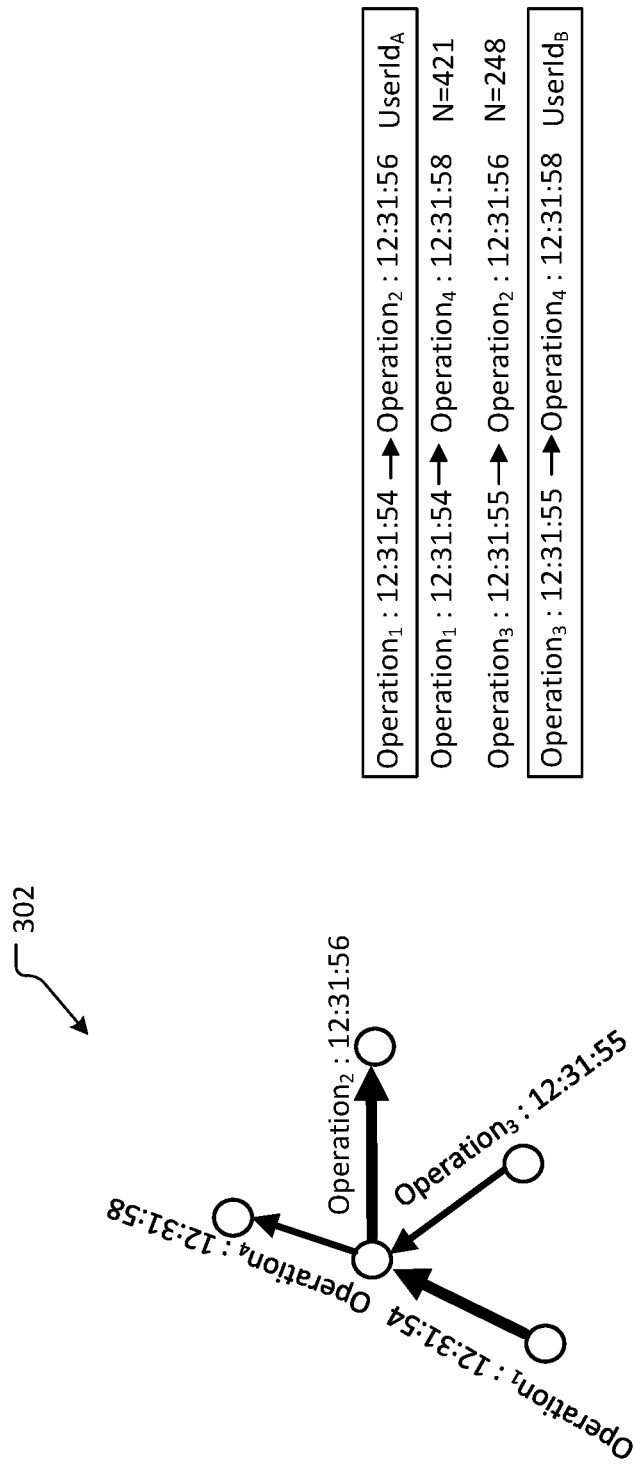
FIG. 3B illustrates a first example directed to a path execution tree noise suppression technique in accordance with examples of the present disclosure.

In accordance with some examples of the present disclosure, in instances where the telemetry data includes information distinguishing users and/or user sessions from one another, such as 302 in FIG. 3B, the association of one object to another object becomes more accurate as the caller, or requester of the first object may be matched to the caller, or requester, of the second object. Accordingly, an object path noise suppression process can be avoided.

Figure 4:
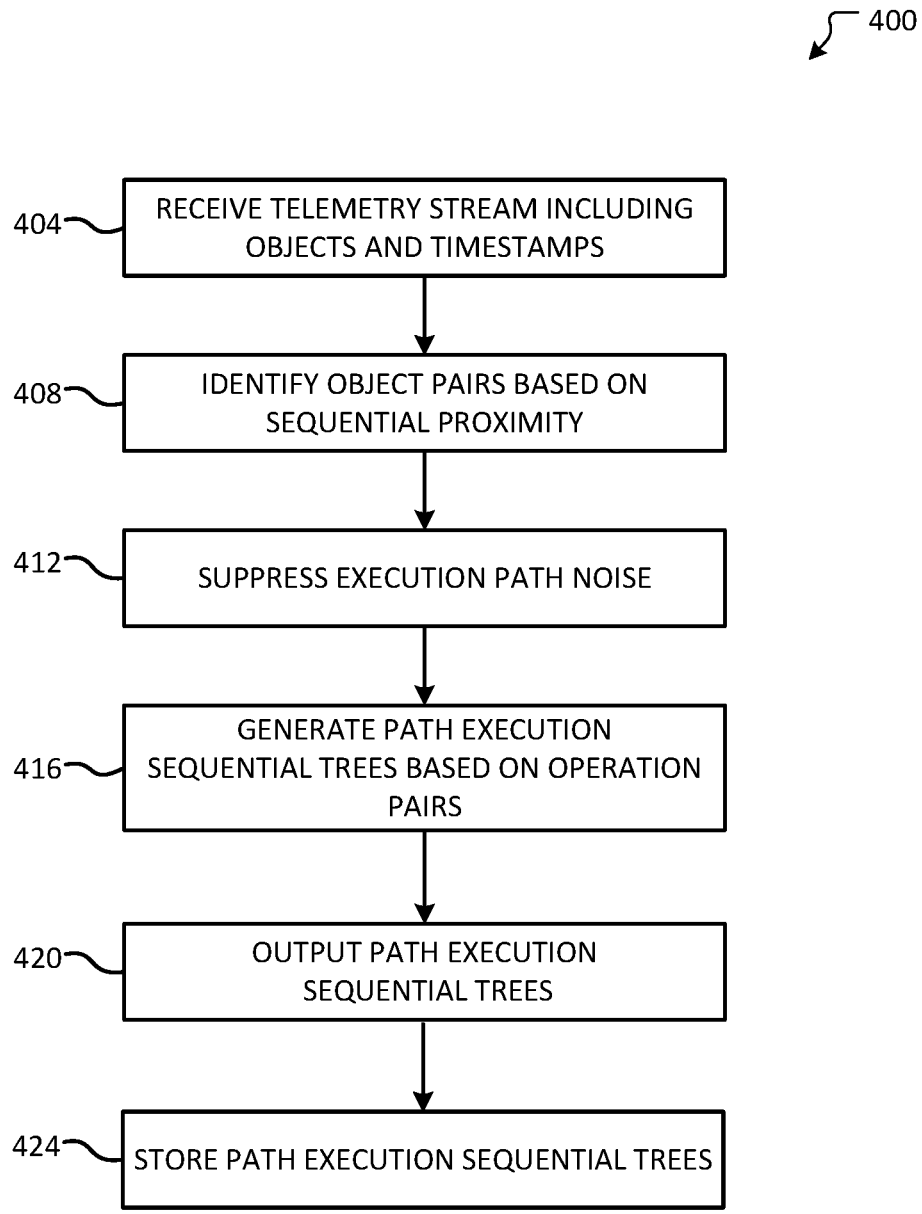
FIG. 4 depicts a first method for generating path execution trees in accordance with examples of the present disclosure.

FIG. 4 depicts an overview of an example method 400 for generating path execution tree in accordance with examples of the present disclosure. In examples, aspects of method 400 are performed by a server, such as the analysis device 108 in FIG. 1. Method 400 begins at operation 404, where a telemetry stream including objects and timestamps associated with a monitored application are received. In some instances, the telemetry stream may be provided from a server device executing the application; in other instances, the telemetry stream may be provided from a telemetry data store of a server device, such as server device 144 that is responsible for maintaining and/or storing telemetry data.

Method 400 may then flow to 408, where object pairs may be identified based on temporal and sequential proximity. For example, a telemetry stream may include a first object, or operation, that is adjacent in time to a second object, or operation. Because such objects and/or operations are adjacent in time, the first and second objects, or operations, may be considered to be object pairs.

As discussed above, additional information specifically associating one object or operation to another object or operation, such as user session information and/or a user identifier, may be lacking; accordingly, the object pairs identified in 408 may include object pairs that do not represent a correct order of object and/or operation execution. Therefore, object, or operation pairs obtained by the object pairs detector 124 for example, may be subjected to object path noise suppression utilizing the object path noise suppressor 128 in 412 of method 400. As previously discussed, some objects, or operations, may lack any association with a previous and/or subsequent object, thereby creating noise in the system 100. Accordingly, the object path noise suppressor may determine which sequence operations are true sequence operations and which sequence operations are not true sequenced operations by tracking the number of object pair execution occurrences over time. If a number of operation pair execution occurrences of an object/operation pair is greater than a threshold, it may be assumed that the object pair is a true sequence and the two objects form an object path, where an object path is a link between the first operation and the second operation. The method 400 may then proceed to 416 where the path execution trees may be generated.

The object path between the object pair may be part of a larger path execution tree which may be generated by the dynamic object path sequential tree generator. The path execution tree that includes one or more object paths may be dynamically generated and output to the graphical user interface 136 at 420. For example, a path execution tree 200 of FIG. 2A may be generated and provided to a user interface. The path execution tree 200 may be stored in a storage area at 424.

Figure 5:
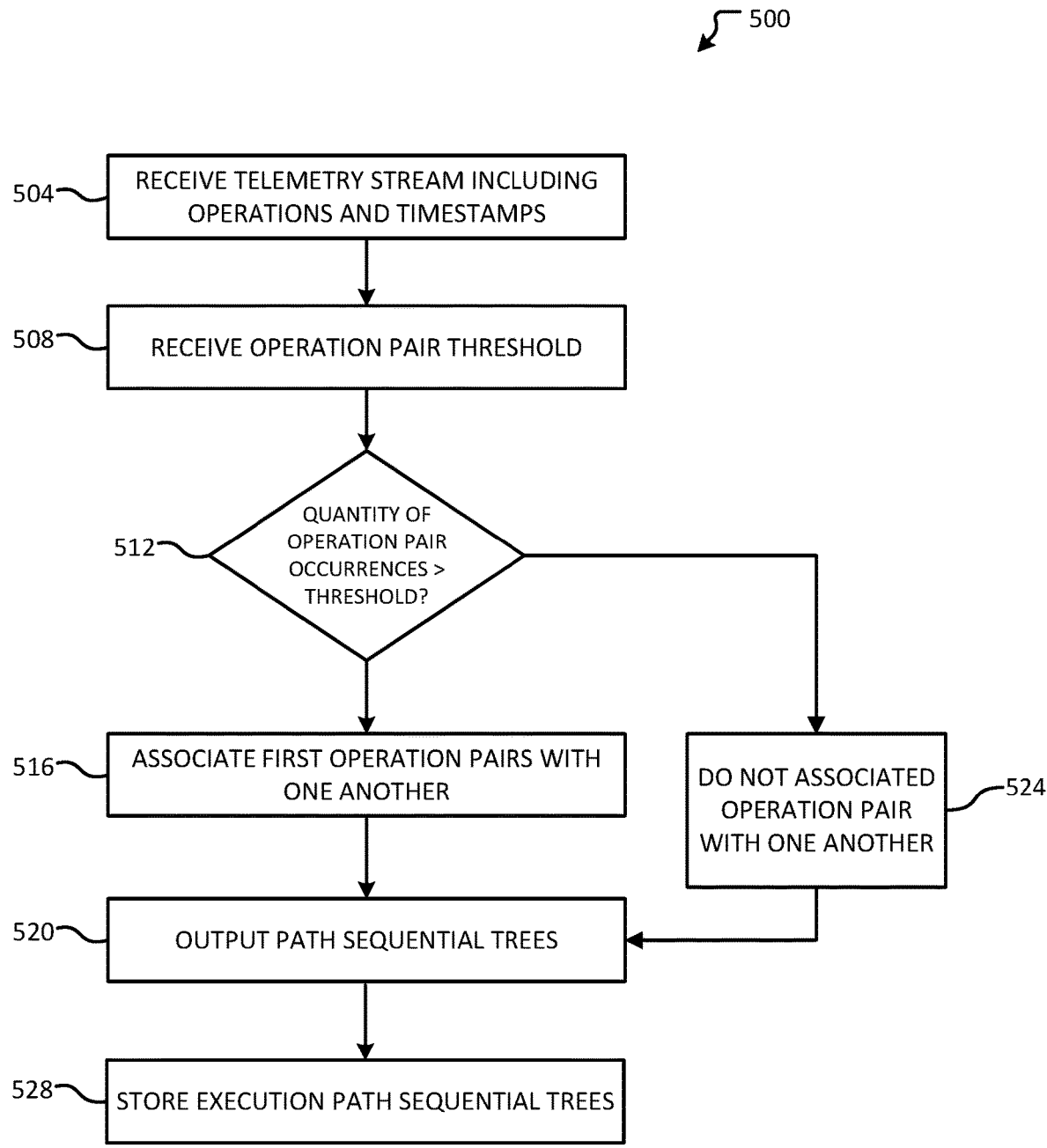
FIG. 5 depicts a second method for generating path execution trees and performing noise suppression in accordance with examples of the present disclosure.

FIG. 5 depicts an overview of an example method 500 for suppressing execution path noise in accordance with examples of the present disclosure. More specifically, execution path noise may exist when incorrect execution paths are utilized to generate the path execution trees, such as those path execution trees depicted in FIG. 2. As previously discussed with respect to FIG. 3A and FIG. 3B, utilizing timestamps alone to generate object pairs is insufficient to ensure that object pairs provided in proximity to one another are indeed associated with one another. Aspects of method 500 are performed by a server, such as the analysis device 108 in FIG. 1. Method 500 begins at operation 504, where a telemetry stream including objects and timestamps associated with a monitored application are received. In some instances, the telemetry stream may be provided from a server device executing the application; in other instances, the telemetry stream may be provided from a telemetry data store of a server device, such as server device 144 that is responsible for maintaining and/or storing telemetry data. Method 500 may then flow to 508, where object pairs identified based on sequential and temporal proximity maybe received. The method 500 then compares, at 512, a number of occurrences of each object pair to a threshold to determine which object pairs include objects, or operations, most likely to be associated with one another. That is, object pairs having temporal and sequential proximity may be assumed to be associated with one another and therefore may be linked at 516 as an object pair path when a number of occurrences of each object pair is greater than a threshold. If, a number of occurrences of each object pair is less than a threshold, then the object pairs are not associated with one another at 524.

The method 500 may then proceed to 520 where the path execution trees may be generated. That is, the object path between the object pair may be part of a larger path execution tree which may be generated by the dynamic object path sequential tree generator. The object path sequential tree that includes one or more object paths may be dynamically generated and output to the graphical user interface 136 at 520. For example, a path execution tree 200 of FIG. 2A may be generated and provided to a user interface. The path execution tree 200 may be stored in a storage area at 524.

Figure 6:
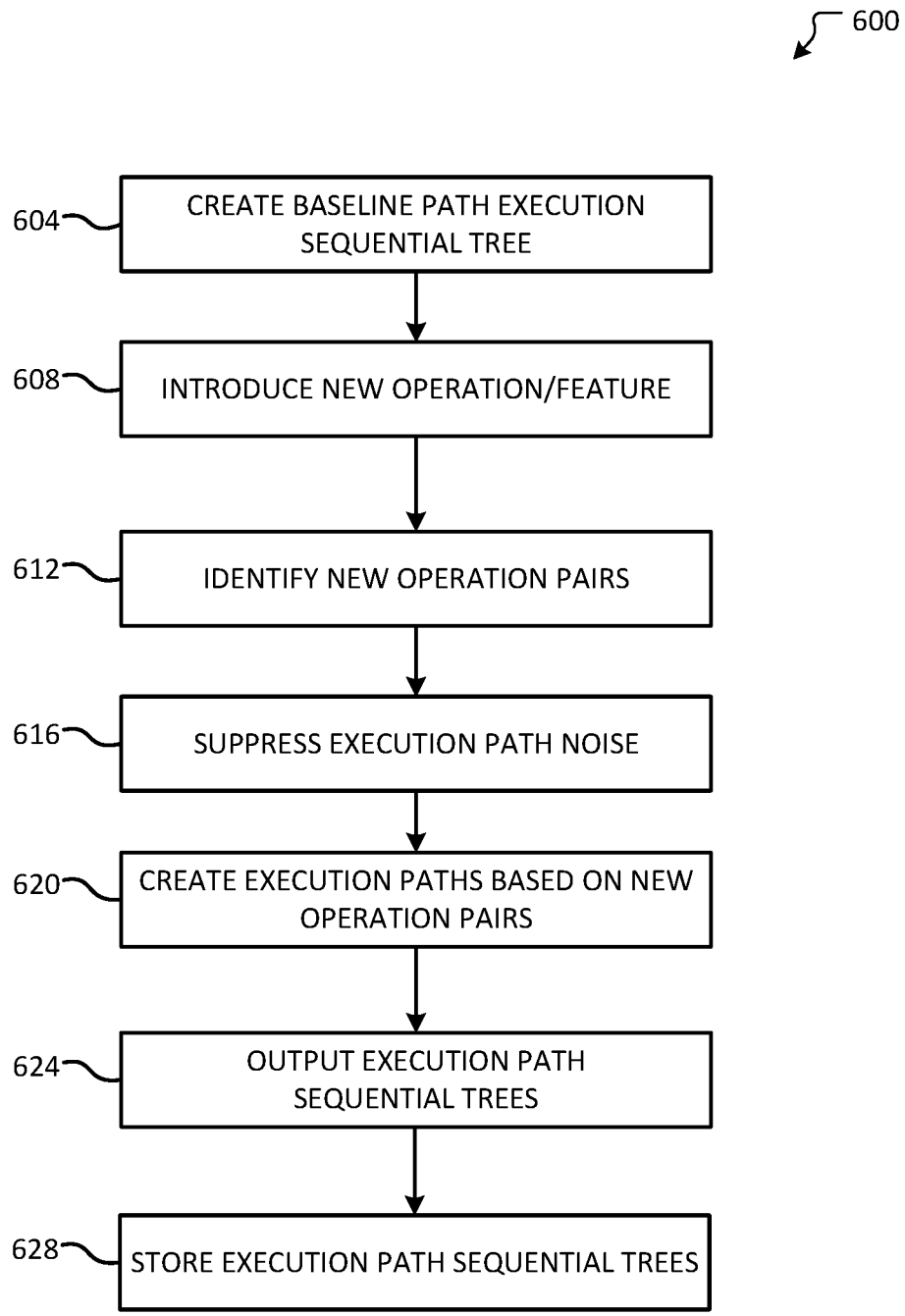
FIG. 6 depicts a third method for generating path execution trees in accordance with examples of the present disclosure.

FIG. 6 depicts an overview of an example method 600 for generating a baseline path execution tree and comparing the baseline path execution tree to a path execution tree including a new feature; such comparison may be utilized to determine how the new feature impacts path execution flow, if any. Aspects of method 600 are performed by a server, such as the analysis device 108 in FIG. 1. Method 600 begins at operation 604, where a baseline of the existing path execution flow may be obtained. That is, similar to 416 of FIG. 4, the path execution tree may be generated as a baseline and may be used to compare future impacts of path execution flow due to the additional new feature(s). At 608, a new operation or feature may be added to the monitored application. At 612, new operation or object pairs may be obtained over time. For example, as users are notified of the addition of the new feature, traffic patterns for paths associated with the path execution trees that include the new feature may increase. In instances where the telemetry data stream does not include user identifying information, such as user session information and/or a user identifier, method 600 may proceed to 616 where the execution path noise may be suppressed utilizing any one of the manners previously discussed. At 620, new execution paths based on the new operation path pairs may be generated such that new execution path sequential trees reflect updated traffic flow patterns. At 624, the baseline path execution tree and the newly generated execution path sequential tree may be compared to one another to determine the impact, if any, of the newly added feature to the monitored application. The execution path sequential threes may be stored at 628.

Figure 7:
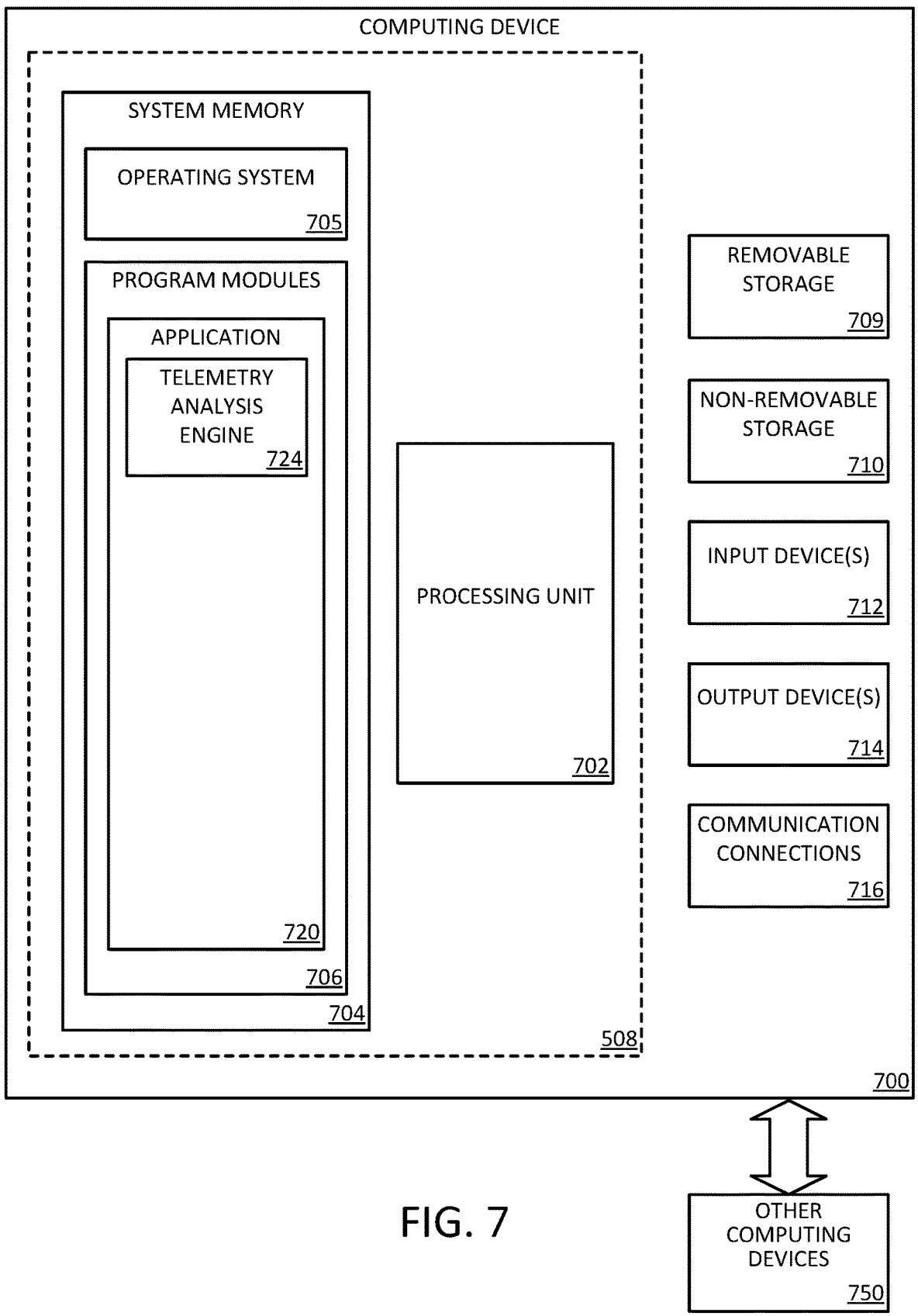
FIG. 7 is a block diagram illustrating example physical components of a computing device with which aspects of the disclosure may be practiced.
Figure 8A:
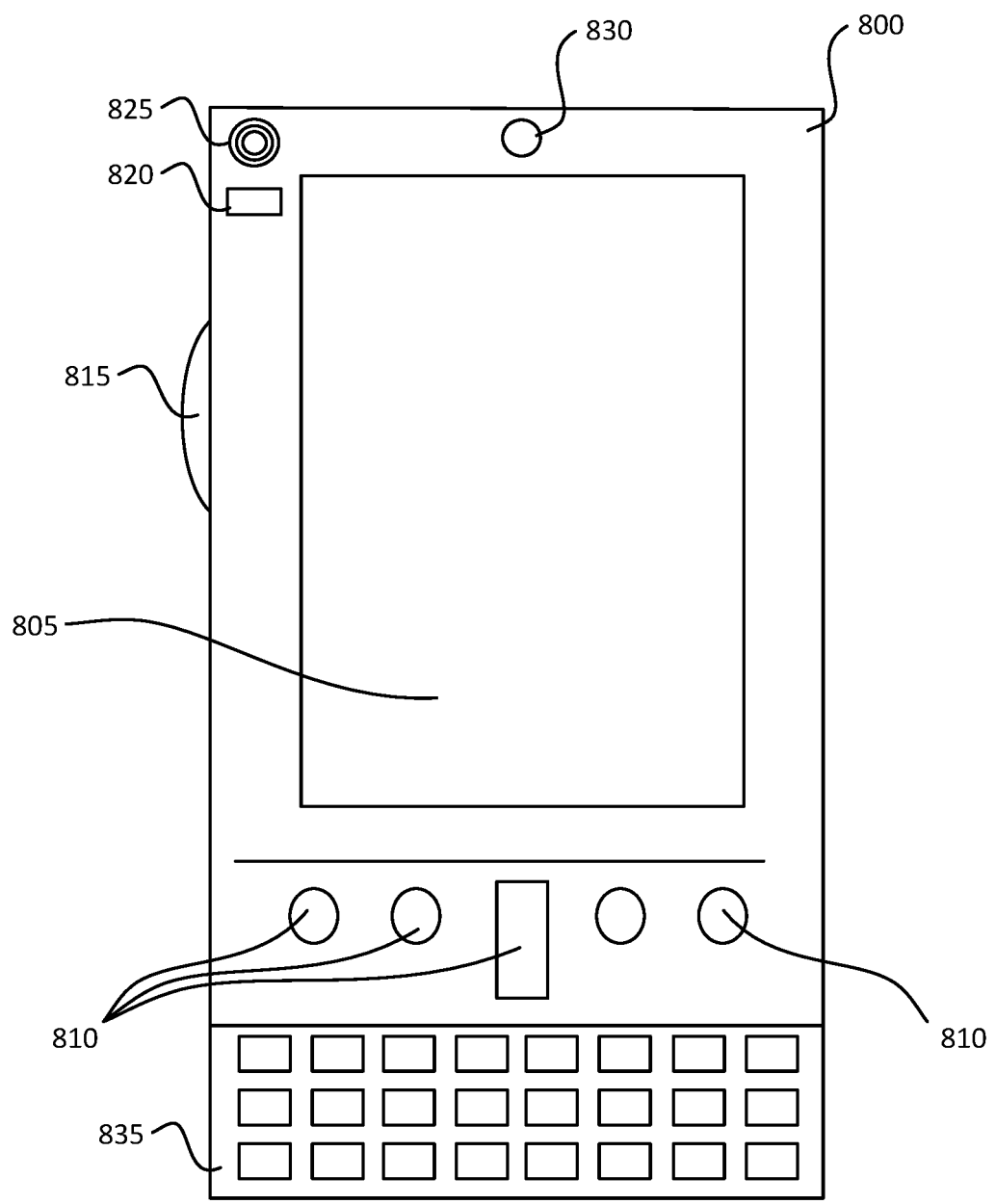
FIGS. 8A and 8B are simplified block diagrams of a mobile computing device with which aspects of the present disclosure may be practiced.
Figure 8B:
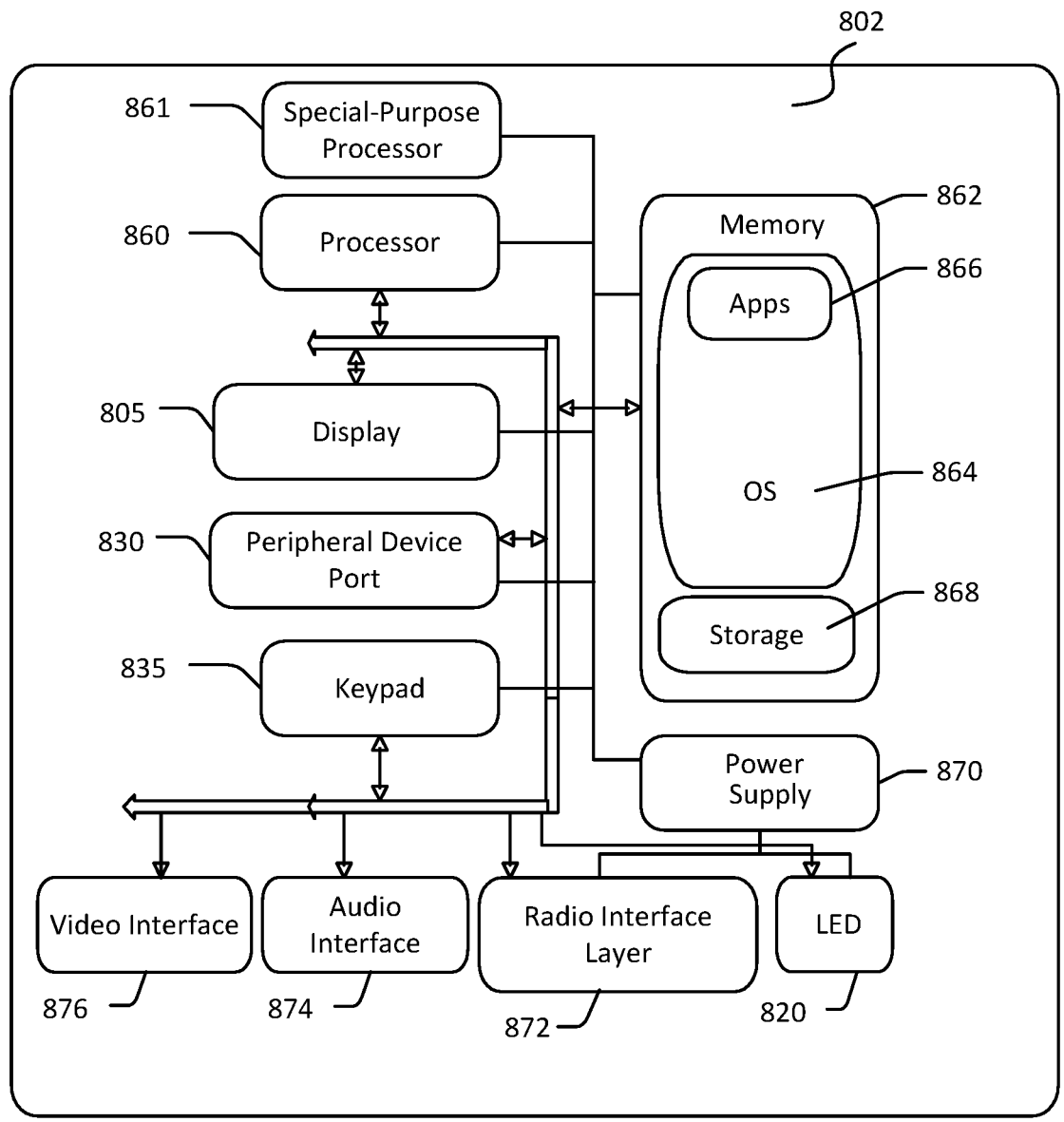
Figure 9:
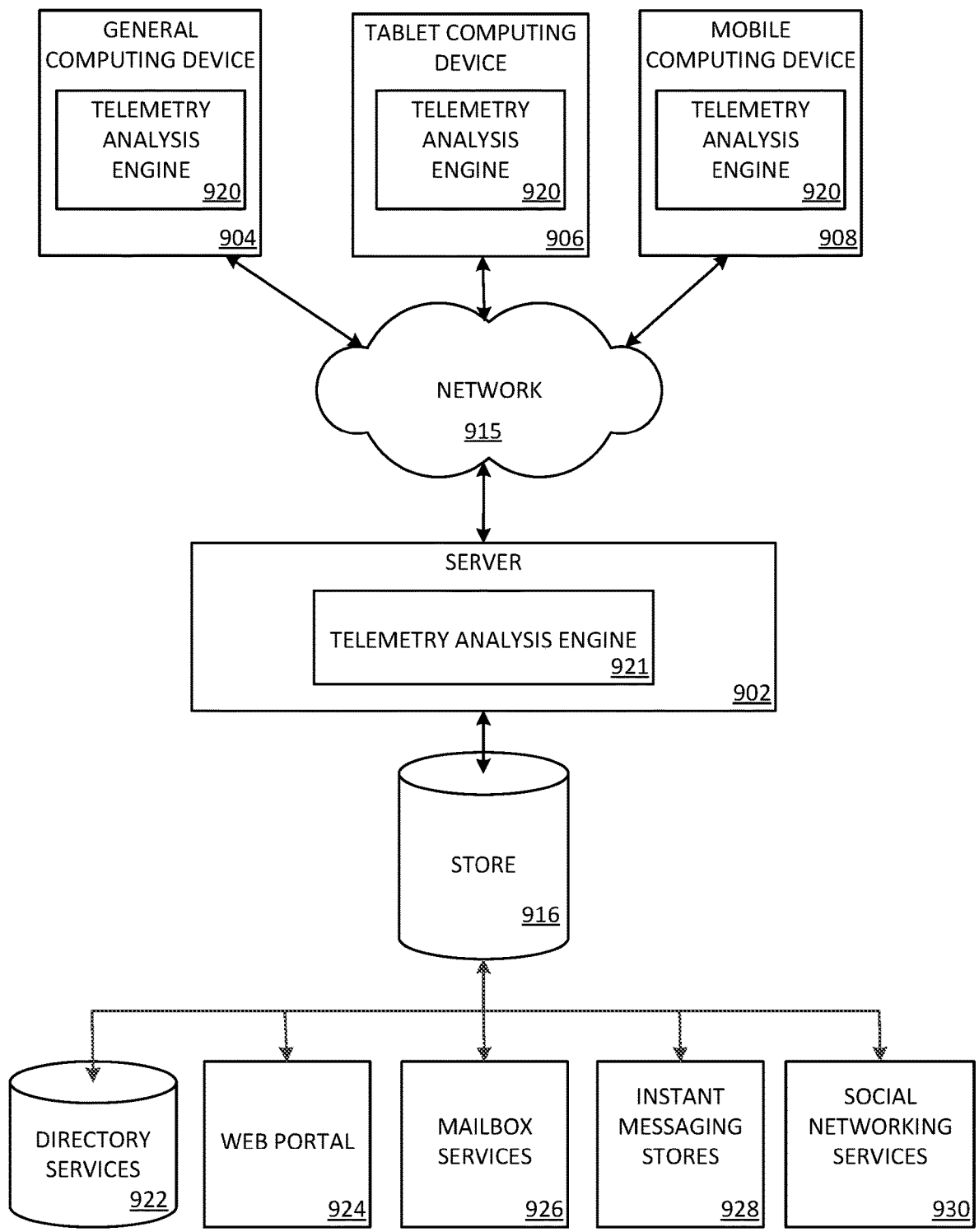
FIG. 9 is a simplified block diagram of a distributed computing system in which aspects of the present disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above, including the server devices 104 and 144 and the analysis device 108 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store the telemetry analysis engine 724. The operating system 707, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the at least one processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 770. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack). an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated. they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A telemetry analysis engine 920 may be employed by a client that communicates with server device 902, and/or the telemetry analysis engine 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

FIG. 8 illustrates an exemplary mobile computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In accordance with some examples of the present disclosure, a system is provided. The system may include a processor, and memory storing instructions that, when executed by the processor, cause the system to perform a set of operations, the set of operations including: receiving telemetry information associated with an execution of a plurality of objects of an application, determining a plurality of object pairs, each object pair including a first object having been executed prior to a second object of the object pair, determining a relationship between at least one of the first object or the second object of each object pair and at least one other object in a different object pair, generating a path execution tree based on the plurality of object pairs and the determined relationship, and causing display of a user interface including the plurality of object pairs.

In accordance with at least one aspect of the above system, the telemetry information includes a unique object identifier for each object of the plurality of objects and a timestamp associated with an execution of each object of the plurality of objects. In accordance with at least one aspect of the above system, the set of operations includes determining a count associated with each object pair of the plurality of object pairs, wherein the count indicates a number of times the object pair has occurred within a period of time, and excluding the object pair from the path execution tree when the count is less than a threshold. In accordance with at least one aspect of the above system, the set of operations includes displaying an indication at the user interface representative of the count associated with each object pair for each object of the plurality of object pairs. In accordance with at least one aspect of the above system, the set of operations includes generating a baseline for the path execution tree based on the plurality of object pairs, receiving second telemetry information associated with the execution of the plurality of objects at a modified application, the telemetry information including a unique object identifier for one or more objects added to the modified application, determining a plurality of object pairs for the one or more added objects, each object pair including a first object having been executed prior to a second object of the object pair, and determining a relationship between at least one of the first object or the second object of the object pair for at least one added object, each object pair for the at least one added object and at least one other object in a different object pair. In accordance with at least one aspect of the above example, the set of operations includes storing the path execution tree at a location other than the location from which the telemetry information is received. In accordance with at least one aspect of the above system, the set of operations includes determining the plurality of object pairs based on at least one of a user identifier or user session information. In accordance with at least one aspect of the above system, the set of operations includes determining a plurality of object sets, each object set including a first object, a second object, and a third object, the first object having been executed prior to the second object, and the second object having been executed prior to the third object, determining a second relationship between at least one of the first object or the third object of each object set and at least one other object in a different object set or different object pair, generating a path execution tree based on the plurality of object sets, the plurality of object pairs, and the determined second relationship, and causing display of a user interface including the plurality of object pairs.

In accordance with some examples of the present disclosure, a method for visualizing application usage is provided. The method may include receiving telemetry information associated with an execution of a plurality of objects of an application, wherein the telemetry information includes a unique object identifier for each object of the plurality of objects and a timestamp associated with an execution of each object of the plurality of objects, determining a plurality of object pairs based on the telemetry information, each object pair including a first object having been executed prior to a second object of the object pair, determining a relationship between at least one of the first object or the second object of each object pair and at least one other object in a different object pair. generating a path execution tree based on the plurality of object pairs and the determined relationship, and causing display of a user interface including the plurality of object pairs.

At least one aspect of the above method includes determining a count associated with each object pair of the plurality of object pairs, wherein the count indicates a number of times the object pair has occurred within a period of time, and excluding the object pair from the path execution tree when the count is less than a threshold. At least one aspect of the above method includes displaying an indication at the user interface representative of the count associated with each object pair for each object of the plurality of object pairs. At least one aspect of the above method includes generating a baseline for the path execution tree based on the plurality of object pairs, receiving second telemetry information associated with the execution of the plurality of objects at a modified application, the telemetry information including a unique object identifier for one or more objects added to the modified application, determining a plurality of object pairs for the one or more added objects, each object pair including a first object having been executed prior to a second object of the object pair, and determining a relationship between at least one of the first object or the second object of the object pair for at least one added object, each object pair for the at least one added object and at least one other object in a different object pair. At least one aspect of the above method includes storing the path execution tree at a location other than the location from which the telemetry information is received. At least one aspect of the above method includes determining the plurality of object pairs based on at least one of a user identifier or user session information. At least one aspect of the above method includes determining a plurality of object sets, each object set including a first object, a second object, and a third object, the first object having been executed prior to the second object, and the second object having been executed prior to the third object, determining a second relationship between at least one of the first object or the third object of each object set and at least one other object in a different object set or different object pair, generating a path execution tree based on the plurality of object sets, the plurality of object pairs, and the determined second relationship, and causing display of a user interface including the plurality of object pairs.

In accordance with some examples of the present disclosure, a method is provided. The method may include receiving telemetry information associated with the execution of a plurality of objects of an application, wherein the telemetry information includes a unique object identifier for each object of the plurality of objects and a timestamp associated with an execution of each object of the plurality of objects, determining a plurality of object pairs, each object pair including a first object having been executed prior to a second object of the object pair, determining a count associated with each object pair of the plurality of object pairs, wherein the count indicates a number of times the object pair has occurred within a period of time, determining a relationship between at least one of the first object or the second object of each object pair and at least one other object in a different object pair, generating a path execution tree based on the plurality of object pairs, the determined relationship, and the count associated with each object pair of the plurality of object pairs. and causing display of a user interface including the plurality of object pairs.

At least one aspect of the above method includes excluding each object pair from the path execution tree when the count is less than a threshold. At least one aspect of the above method includes displaying an indication at the user interface representative of the count associated with each object pair for each object of the plurality of object pairs. At least one aspect of the above method includes generating a baseline for the path execution tree based on the plurality of object pairs, receiving second telemetry information associated with the execution of the plurality of objects at a modified application, the telemetry information including a unique object identifier for one or more objects added to the modified application, determining a plurality of object pairs for the one or more added objects, each object pair including a first object having been executed prior to a second object of the object pair, and determining a relationship between at least one of the first object or the second object of the object pair for at least one added object, each object pair for the at least one added object and at least one other object in a different object pair. At least one aspect of the above method includes storing the path execution tree at a location other than the location from which the telemetry information is received.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations. modifications, and alternate aspects falling within the spirit of the broader aspects of the general inventive concept embodied in this application that do not depart from the broader scope of the claimed disclosure.

What is claimed is:

1. A system comprising:
a processor; and
memory storing instructions that, when executed by the processor, cause the system to perform operations comprising:
receiving telemetry information identifying a plurality of executable objects of an application;
determining a plurality of object pairs from the telemetry information, each object pair including a first object having been executed prior to a second object of the object pair;
determining a relationship between at least one of the first object or the second object of each object pair and at least one other object in a different object pair;
generating a path execution tree based on the plurality of object pairs and the determined relationship; and
causing display of a user interface including the path execution tree.

2. The system of claim 1, wherein the telemetry information includes a unique object identifier for each object of the plurality of objects and a timestamp associated with an execution of each object of the plurality of objects.

3. The system of claim 2, wherein the set of operations further comprises:
determining a count associated with each object pair of the plurality of object pairs, wherein the count indicates a number of times the object pair has occurred within a period of time; and
excluding the object pair from the path execution tree when the count is less than a threshold.

4. The system of claim 3, wherein the set of operations further comprises: displaying an indication at the user interface representative of the count associated with each object pair for each object of the plurality of object pairs.

5. The system of claim 1, wherein the set of operations further comprises:
generating a baseline for the path execution tree based on the plurality of object pairs;
receiving second telemetry information associated with the execution of the plurality of objects at a modified application, the telemetry information including a unique object identifier for one or more objects added to the modified application;
determining a plurality of object pairs for the one or more added objects, each object pair including a first object having been executed prior to a second object of the object pair; and
determining a relationship between at least one of the first object or the second object of the object pair for at least one added object, each object pair for the at least one added object and at least one other object in a different object pair.

6. The system of claim 1, wherein the set of operations further comprises: storing the path execution tree at a location other than the location from which the telemetry information is received.

7. The system of claim 1, wherein the set of operations further comprises: determining the plurality of object pairs based on at least one of a user identifier or user session information.

8. The system of claim 1, wherein the set of operations further comprises:
determining a plurality of object sets, each object set including a first object, a second object, and a third object, the first object having been executed prior to the second object, and the second object having been executed prior to the third object;
determining a second relationship between at least one of the first object or the third object of each object set and at least one other object in a different object set or different object pair;
generating the path execution tree based on the plurality of object sets, the plurality of object pairs, and the determined second relationship; and
causing display of a user interface including the path execution tree.

9. A method for visualizing application usage, comprising:
receiving telemetry information identifying a plurality of executable objects of an application, wherein the telemetry information includes a unique object identifier for each object of the plurality of objects and a timestamp associated with an execution of each object of the plurality of objects;
determining a plurality of object pairs based on the telemetry information, each object pair including a first object having been executed prior to a second object of the object pair;
determining a relationship between at least one of the first object or the second object of each object pair and at least one other object in a different object pair;
generating a path execution tree based on the plurality of object pairs and the determined relationship; and
causing display of a user interface including the path execution tree.

10. The method of claim 9, further comprising:
determining a count associated with each object pair of the plurality of object pairs, wherein the count indicates a number of times the object pair has occurred within a period of time; and
excluding the object pair from the path execution tree when the count is less than a threshold.

11. The method of claim 10, further comprising: displaying an indication at the user interface representative of the count associated with each object pair for each object of the plurality of object pairs.

12. The method of claim 9 further comprising:
generating a baseline for the path execution tree based on the plurality of object pairs;
receiving second telemetry information associated with the execution of the plurality of objects at a modified application, the telemetry information including a unique object identifier for one or more objects added to the modified application;
determining a plurality of object pairs for the one or more added objects, each object pair including a first object having been executed prior to a second object of the object pair; and determining a relationship between at least one of the first object or the second object of the object pair for at least one added object, each object pair for the at least one added object and at least one other object in a different object pair.

13. The method of claim 9, further comprising: storing the path execution tree at a location other than the location from which the telemetry information is received.

14. The method of claim 9, further comprising: determining the plurality of object pairs based on at least one of a user identifier or user session information.

15. The method of claim 9, further comprising:
determining a plurality of object sets, each object set including a first object, a second object, and a third object, the first object having been executed prior to the second object, and the second object having been executed prior to the third object;
determining a second relationship between at least one of the first object or the third object of each object set and at least one other object in a different object set or different object pair;
generating the path execution tree based on the plurality of object sets, the plurality of object pairs, and the determined second relationship; and
causing display of a user interface including the path execution tree.

16. A method comprising:
receiving telemetry information identifying a plurality of executable objects of an application, wherein the telemetry information includes a unique object identifier for each object of the plurality of objects and a timestamp associated with an execution of each object of the plurality of objects;
determining a plurality of object pairs from the telemetry information, each object pair including a first object having been executed prior to a second object of the object pair;
determining a count associated with each object pair of the plurality of object pairs, wherein the count indicates a number of times the object pair has occurred within a period of time;
determining a relationship between at least one of the first object or the second object of each object pair and at least one other object in a different object pair;
generating a path execution tree based on the plurality of object pairs, the determined relationship, and the count associated with each object pair of the plurality of object pairs; and
causing display of a user interface including the path execution tree.

17. The method of claim 16, further comprising: excluding each object pair from the path execution tree when the count is less than a threshold.

18. The method of claim 16, further comprising: displaying an indication at the user interface representative of the count associated with each object pair for each object of the plurality of object pairs.

19. The method of claim 16 further comprising:
generating a baseline for the path execution tree based on the plurality of object pairs;
receiving second telemetry information associated with the execution of the plurality of objects at a modified application, the telemetry information including a unique object identifier for one or more objects added to the modified application;

determining a plurality of object pairs for the one or more added objects, each object pair including a first object having been executed prior to a second object of the object pair; and determining a relationship between at least one of the first object or the second object of the object pair for at least one added object, each object pair for the at least one added object and at least one other object in a different object pair.

20. The method of claim 16, further comprising: storing the path execution tree at a location other than the location from which the telemetry information is received.

\* \* \* \* \*